United States Patent

[11] 3,542,047

| [72] | Inventor | Lowell F. Nelson |
| | | Muskegon, Michigan |
| [21] | Appl. No. | 702,222 |
| [22] | Filed | Feb. 1, 1968 |
| [45] | Patented | Oct. 24, 1970 |
| [73] | Assignee | Enterprise Brass Works |
| | | Muskegon, Michigan |
| | | a corporation of Michigan |

[54] TEMPERATURE AND IMPACT RESPONSIVE SHUT-OFF VALVE
13 Claims, 4 Drawing Figs.

[52] U.S. Cl. .............................................. 137/68, 137/80; 285/2
[51] Int. Cl. ................................................ F16k 17/38
[50] Field of Search ............................................... 137/68–71, 39, 79, 80, 527.4, 797; 251/298, 303; 285/2

[56] References Cited
UNITED STATES PATENTS

| 300,373 | 6/1884 | Jerrold et al. | 251/276 |
| 2,083,054 | 6/1937 | Cline | 285/2 |
| 602,378 | 4/1898 | Thomson | 285/2X |
| 929,944 | 8/1909 | Hawley et al. | 251/298X |
| 1,479,789 | 1/1924 | Collin | 137/79 |
| 3,209,773 | 10/1965 | Klaus | 137/68 |
| 3,396,739 | 8/1968 | Rosell | 137/69X |

Primary Examiner—William F. O'Dea
Assistant Examiner—Richard Gerard
Attorney—Barnard, McGlynn and Reising ABSTRACT: A shut-off valve assembly including a housing having first and second independent sections which are connected together by shearable bolts so that the sections separate in response to a predetermined force. The second section of the valve assembly supports a rotatable shaft and the rotatable shaft in turn has an arm secured thereto with a valve member disposed thereon so that upon rotation of the shaft the valve member engages a valve seat in the second section of the housing. The shaft extends externally of the second section of the housing and has a lever extending therefrom with a projection thereon. A bimetallic link is secured to the first section of the housing and has its opposite end in abutting engagement with the projection on the lever to hold the valve in the open position against the biasing action of a spring which urges the valve to the closed position.

Patented Nov. 24, 1970 3,542,047

INVENTOR.
Lowell F. Nelson
BY
Bernard, McGlynn Reising
ATTORNEYS

TEMPERATURE AND IMPACT RESPONSIVE SHUT-OFF VALVE

This invention relates to a shutoff valve assembly having a valve seat and a valve means movable between open and closed positions and normally held in the open position but movable to the closed position as a result of a predetermined impact and/or a predetermined temperature.

Although valves of this type may be used in various environments they have particular utility as emergency shutoff valves in gasoline supply lines such as those utilized in dispensing systems at gasoline filling stations.

There are various shutoff valve assemblies known in the prior art for automatically closing in response to a predetermined impact or in response to a predetermined temperature. One of the most pertinent prior art shutoff valve assemblies is one which includes an integral housing having first and second sections which are integrally connected together but are divided by a groove providing a weakened portion so that the two sections shear from one another in response to a predetermined force. To obtain the automatic closing function in response to a predetermined temperature, many of the prior art valves utilize a fusible link to hold the valve means in the open position, the link incorporates or comprises fusible material.

The problem associated with the valves comprising an integral housing with a weakened portion to define first and section sections which may be sheared apart, is that once the valve has been sheared into two sections in response to a predetermined force, the valve is no longer useable and must be replaced by a new valve. The same problem is associated with the valves which utilize fusible links or fusible plugs in links in that the links are consumed or destroyed and must be replaced in the event the valve closes in response to a predetermined temperature.

There are valve assemblies in the prior art which utilize thermostats which move to allow a valve to move to the closed position; however, the valve members move to the closed position under the force of gravity. Thus, such valves must be oriented in a certain predetermined position so that gravity urges the valve to the closed position.

Accordingly, it is an object and feature of this invention to provide an improved shutoff valve assembly having a valve means biased to the closed position but normally held in the open position by a temperature responsive means which moves out of engagement with the valve means in response to a predetermined temperature thereby allowing the valve means to move to the closed position.

In correlation with the foregoing object another object and feature of this invention is to provide a valve assembly having a valve means held in the open position by a bimetallic link which moves out of engagement with the valve means in response to a predetermined temperature but which is not destroyed and may be reset into engagement with the valve means to hold the latter in the open position.

Another object and feature of this invention is to provide a shutoff valve assembly having a housing including first and second independent sections with shearable means connecting the sections together for shearing in response to a predetermined force urging the sections apart thereby to allow the sections to separate.

In correlation with the foregoing object, it is an object and feature of this invention to connect the two independent sections of the housing together by shearable bolts whereby once the sections have been separated they may be reconnected together by inserting new shearing bolts.

A further object and feature of this invention is to provide a valve assembly with a valve seat and valve means movable into seating engagement with the valve seat and wherein the valve means includes a valve member having a spherical surface and supported so that it may nutate and move laterally to provide a self-centering action when the valve member engages the valve seat.

In correlation with the foregoing object and feature, it is an object and feature of this invention to support the valve member on a spindle which has a conical surface against which the valve member seats when in seating engagement with the valve seat.

Other objects and attendant advantages of the present invention will be readily appreciated as the same becomes better understood by reference to the following detailed description when considered in connection with the accompanying drawings wherein.

Referring now to the drawings wherein like numerals indicate like or corresponding parts throughout the several views a preferred embodiment of the shutoff valve assembly of the instant invention is generally shown at 10.

Figure 1:
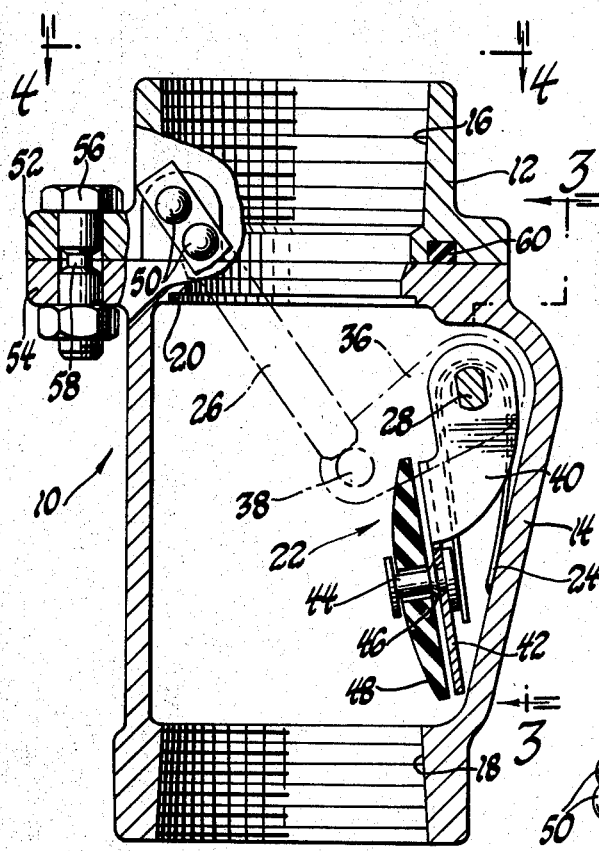
FIG. 1 is a fragmentary cross-sectional view of a preferred embodiment of the instant invention and showing the valve assembly in the open position.

The valve assembly includes a housing comprising a first section 12 and a second section 14. The first or upper section 12 includes internal threads 16 and the second or lower section 14 includes internal threads 18 whereby the valve may be disposed in a fluid line.

A valve seat 20 is disposed in the second section 14 of the housing. A valve means generally indicated at 22 is operatively supported within the second section 14 of the housing for movement between an open position as illustrated in FIG. 1 and a closed position in seating engagement with the valve seat 20 as illustrated in FIG. 2.

There is also included biasing means comprising the leaf spring 24 for urging the valve means to the closed position.

Figure 2:
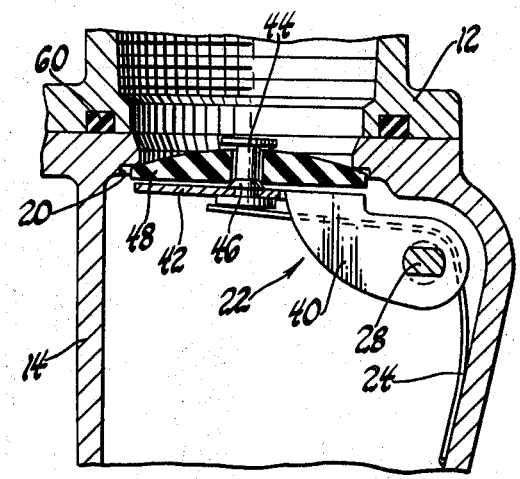
FIG. 2 is a fragmentary cross-sectional view similar to FIG. 1 but showing the valve assembly in the closed position.

Further, there is a temperature responsive means comprising the bimetallic link 26 which normally engages the valve means 22 to hold the valve means 22 in the open position as illustrated in FIG. 1 and which is movable in response to heat for disengaging the valve means at a predetermined temperature so that the valve means 22 moves to the closed position as illustrated in FIG. 2. In other words, the temperature responsive means comprising the bimetallic link 26 normally engages the valve means 22 to hold the valve means 22 in the open position and moves in response to heat to disengage the valve means 22 at a predetermined temperature and moves back toward a position to engage the valve means 22 in response to a subsequent decrease in temperature whereby the bimetallic link 26 disengages the valve means 22 at the predetermined temperature so that the valve means 22 moves to the closed position illustrated in FIG. 2 and may be reset into engagement with the valve means 22 when below the predetermined temperature.

Figure 3:
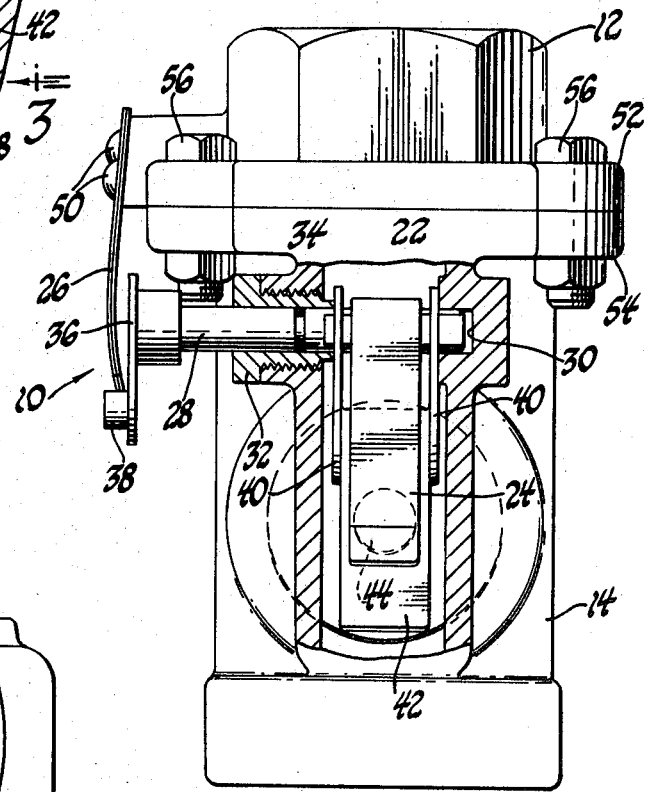
FIG. 3 is a fragmentary cross-sectional view taken substantially along line 3–3 of FIG. 1.

Valve means 22 includes a shaft 28 rotatably supported in the second section 14 of the housing, as best illustrated in FIG. 3. The second section 14 of the housing includes an annular recess 30 in which one end of the shaft 28 is rotatably disposed and a sleeve 32 threadedly engages the second section 14 of the housing and rotatably supports the shaft 28. An O-ring 34 surrounds the shaft 28 for sealing purposes. The shaft 28 extends exteriorly of the second section 14 of the housing and a lever means, which comprises the lever 36 and projection 38, is supported thereon.

Also included in the valve means is a bifurcated arm 40 disposed in the second section 14 and extending radially from the shaft 28 to a distal end. The shaft 28 has flattened or keyed portions with which the arm 40 coacts to rotate with the shaft 28. In other words, the arm 40 is nonrotatably connected to the shaft 28. The arm 40 also includes a planar support section 42. A spindle 44 is supported on the support section 42 adjacent the distal end of the arm 40. The spindle has a conical surface 46 adjacent the support section 42 of the arm 40. A valve member 48 having a spherical surface is disposed loosely on the spindle 44 so that the valve member 48 may nutate and move laterally relative to the spindle to provide a self-centering action when the valve member engages the seat. In addition, when the valve member 48 engages the seat 20 the valve member 48 is also in seating engagement with the conical surface 46. When describing the valve member 48 as being able to nutate, this means that the valve member may move similarly to a coin dropped on a flat surface as it wobbles into a still, flat engagement with the flat surface. In other words, the spindle 44 extends through a hole in the valve member 48 so that there is a space between the spindle and the valve member in the hole to allow the valve member 48 to move relative to the spindle 44 to accomplish a self-centering action when the valve member 48 moves into seating engagement with the seat 20.

The spring 24 reacts between the end of the spindle, or in effect the arm 40, and the second section 14 so as to urge the valve member 48 forward and into engagement with the seat 20 when the link 26 disengages the projection 38 and/or when the sections 12 and 14 separate as will become more clear hereinafter.

Figure 4:
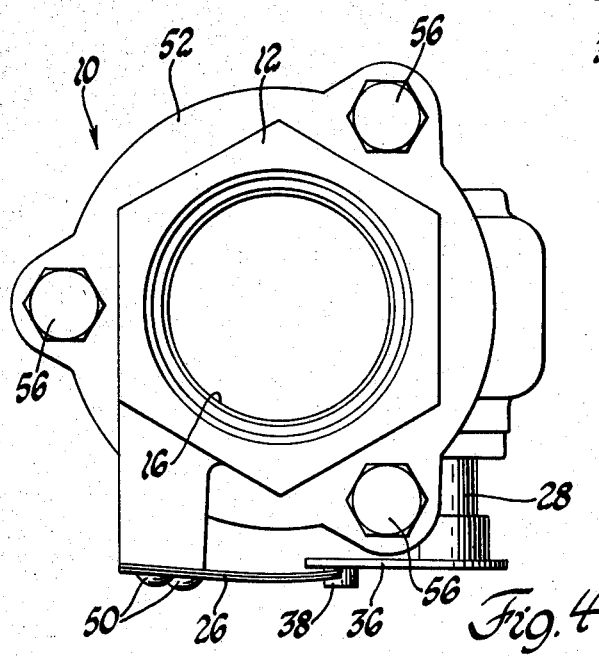
FIG. 4 is a view taken substantially along line 4–4 of FIG. 1.

The link 26 is connected at a first end thereof by screws 50 to the first section 12 of the housing. The link 26 is normally in abutting engagement with the projection 38 of the lever means at a second end thereof. The link 26 preferably comprises two metallic materials each of which has a coefficient of thermal expansion different from the other. Normally these respective metal materials are in the form of strips secured together along the lengths thereof, as is best illustrated in FIGS. 3 and 4. Thus, when the temperature increases, the link 26 begins to warp or curve so that the second end thereof moves relative to the projection 38. At a predetermined temperature, which is determined by the materials utilized in the link 26 and the length of the projection 38, the second end of the link 26 will move out of engagement with the projection 38 and the biasing action of the spring 24 will then move the valve member 48 to the closed position where it is in seating engagement with the seat 20.

It should be clear from the description thus far presented that an important advantage and feature of the invention is that in the event the temperature becomes high enough to move the link 26 out of engagement with the projection 38 so that the valve moves to the closed position, the valve may be reset to the open position after the high temperature critical situation has been alleviated or passed, by reengaging the link 26 with the projection 38.

As alluded to above, the housing sections 12 and 14 are nonintegral and completely independent of one another. The first section 12 includes a flange 52 and the second housing section 14 includes a flange 54. Shearable means comprising the shearable bolts 56 and threadedly coacting nuts connect the sections 12 and 14 together in that the bolts pass through holes in the respective flanges 52 and 54. Each bolt 56 has a weakened portion for shearing in response to a predetermined force urging the sections 12 and 14 apart to allow the sections to separate. In the preferred embodiment, the weakened portion comprises a groove 58 in each bolt. An O-ring or gasket 60 is disposed between the sections 12 and 14 for sealing purposes.

In the event of an impact or the like which applies a predetermined force to the valve assembly to urge the sections 12 and 14 apart, the bolts 56 will shear at the grooves 54 to allow the section 12 to separate from the section 14. When the section 12 separates from the section 14, the link 26 is moved out of engagement with the projection 38 and the valve member 48 is moved to the closed position under the biasing action of the spring 24.

The importance of this structure and the inventive concept employed is that once the section 12 has been separated from the section 14 the valve assembly may be again assembled by employing new shearable bolts 56 to connect the sections 12 and 14 together.

As it is evident, therefore, from the foregoing description, the present invention involves various features which combine, as in the preferred embodiment illustrated, to provide a valve assembly combination which is improved over the prior art valve assemblies and provides results and functions not attainable in the prior art valve assemblies. Furthermore, the various inventive features of the preferred valve assembly disclosed herein may be utilized independently of one another even though when combined, as in the preferred embodiment illustrated, a greatly improved valve assembly is provided.

The invention has been described in an illustrative manner and it is to be understood that the terminology which has been used is intended to be in the nature of words of description rather than of limitation.

I claim:

1. A shutoff valve assembly comprising a housing a valve seat disposed in said housing, valve means operatively supported within said housing for movement between an open position and a closed position in seating engagement with said seat, biasing means for urging said valve means to said closed position regardless of the position of said valve assembly, and temperature responsive means normally engaging said valve means to hold said valve means in said open position and for moving in response to heat to disengage said valve means at a predetermined temperature and for moving back toward a position to engage said valve means in response to a subsequent decrease in temperature whereby said temperature responsive means disengages said valve means at said predetermined temperature so that said valve means moves to said closed position and may be reset into engagement with said valve means when below said predetermined temperature, said temperature responsive means including link means connected adjacent a first end thereof to said housing and normally in abutting engagement with said valve means adjacent the second end thereof, said second end being movable relative to said first end in response to heat.

2. An assembly as set forth in claim 1 wherein said valve means includes a shaft rotatably supported in said housing and extending exteriorly of said housing, a lever means extending radially from said shaft exteriorly of said housing, said link means normally being in engagement with said lever means to hold said valve means in said open position and being movable out of engagement with said lever means in response to heat so that said lever means rotates with said shaft as said valve means moves to said closed position.

3. An assembly as set forth in claim 2 wherein said link means comprises two metallic materials each of which has a coefficient of thermal expansion different from the other, said metallic materials being in respective strips which are secured together.

4. An assembly as set forth in claim 2 wherein said housing comprises first and second nonintegral and independent sections, shearable means connecting said sections together for shearing in response to a predetermined force urging said sections apart to allow said sections to separate.

5. An assembly as set forth in claim 4 wherein said shaft is disposed in said second section and said first end of said link means is connected to said first section.

6. An assembly as set forth in claim 5 wherein said shearable means comprises at least one bolt and coacting nut connecting said sections, said bolt having a weakened portion thereon for shearing.

7. An assembly as set forth in claim 6 wherein said weakened portion comprises a groove in said bolt.

8. An assembly as set forth in claim 7 wherein said link means comprises two metallic materials each of which has a coefficient of thermal expansion different from the other, said metallic materials being in respective strips which are secured together.

9. An assembly as set forth in claim 8 wherein said lever means includes a lever extending radially from said shaft and a projection extending laterally from said lever, said link means being in engagement with said projection to hold said valve means in said open position.

10. An assembly as set forth in claim 9 wherein said seat is disposed in said second section of said housing, and said valve means includes an arm disposed in said second section and extending radially from said shaft to a distal end, said arm being nonrotatably connected to said shaft, a spindle supported adjacent said distal end of said arm, said spindle having a conical surface adjacent said arm, a valve member having a spherical surface and disposed loosely on said spindle so that said valve member may nutate and move laterally relative to said spindle to provide a self-centering action when said valve member engages said seat.

11. An assembly as set forth in claim 10 wherein said biasing means comprises a spring reacting between said arm and said second section to move said valve member into engagement with said seat when said link disengages said projection and when said sections separate.

12. An assembly as set forth in claim 1 wherein said housing comprises first and second nonintegral and independent sections, shearable means connecting said sections together for shearing in response to a predetermined force urging said sections apart to allow said sections to separate.

13. An assembly as set forth in claim 12 wherein said shearable means comprises at least one shearable bolt.